United States Patent
Dennison et al.

(10) Patent No.: US 10,173,932 B1
(45) Date of Patent: Jan. 8, 2019

(54) DISPOSABLE CORE DIE AND METHOD OF FABRICATING A CERAMIC BODY

(71) Applicant: General Electric Company, Schenectady, NY (US)

(72) Inventors: Russell Ryder Dennison, Glenville, NY (US); Robert Peter Hanet, Canton, MI (US); Jerod Curtis Kruse, Springboro, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 1118 days.

(21) Appl. No.: 13/731,513

(22) Filed: Dec. 31, 2012

(51) Int. Cl.
*C04B 35/622* (2006.01)

(52) U.S. Cl.
CPC .................. *C04B 35/622* (2013.01)

(58) Field of Classification Search
CPC ......... C04B 35/622; B22C 9/10; B22C 9/103; B22C 9/04; B22C 9/101; B28B 7/342; B28B 7/346
USPC ...... 264/313, 328.2; 425/588; 26/313, 328.2
See application file for complete search history.

(56) References Cited

U.S. PATENT DOCUMENTS

| | | |
|---|---|---|
| 5,250,136 A | 10/1993 | O'Connor |
| 5,798,066 A | 8/1998 | Uram |
| 5,824,250 A | 10/1998 | Whalen et al. |
| 6,255,000 B1 | 7/2001 | O'Connor et al. |
| 6,446,697 B1 | 9/2002 | Shaikh et al. |
| 6,626,230 B1 | 9/2003 | Woodrum et al. |
| 7,287,573 B2 | 10/2007 | McNulty et al. |
| 7,413,001 B2 | 8/2008 | Wang et al. |
| 7,448,433 B2 | 11/2008 | Oritz et al. |
| 7,487,819 B2 | 2/2009 | Wang et al. |
| 7,624,787 B2 | 12/2009 | Lee et al. |
| 7,732,526 B2 | 6/2010 | McNulty et al. |
| 2004/0076519 A1 | 4/2004 | Halfmann et al. |
| 2005/0156361 A1 | 7/2005 | Holowczak et al. |
| 2008/0135202 A1 | 6/2008 | Lee et al. |
| 2008/0135722 A1 | 6/2008 | Wang et al. |
| 2008/0202718 A1 | 8/2008 | Paul et al. |
| 2010/0025001 A1* | 2/2010 | Lee .......................... B22C 7/02 164/23 |

* cited by examiner

*Primary Examiner* — Robert J Grun
(74) *Attorney, Agent, or Firm* — GE Global Patent Operation; John Darling (57) ABSTRACT

A disposable core die includes a first portion defining an inlet configured to receive a slurry therethrough, a second portion integrally formed downstream from the first portion and configured to receive the slurry from the first portion, and a third portion integrally formed downstream from the second portion. The second portion includes a plurality of hollow tubes that are substantially coaxially aligned and have a wall thickness within a range defined between about 0.1 mm and about 0.5 mm, and the third portion defines an outlet configured to discharge excess slurry from the second portion.

10 Claims, 6 Drawing Sheets

DISPOSABLE CORE DIE AND METHOD OF FABRICATING A CERAMIC BODY

BACKGROUND

The field of the present disclosure relates generally to molds for forming ceramic articles and, more specifically, to a thin-walled disposable core die.

At least some known turbine components, such as blades, nozzles, and vanes, have complex geometries. For example, turbine blades and nozzles may have internal passages and/or voids defined therein that must be manufactured in accordance with accurate dimensions having tight tolerances. In such instances, investment casting is generally effective at manufacturing parts that require precise dimensional accuracy.

When manufacturing turbine components as described above, investment casted parts may be formed and prototyped in a thermoplastic die before more durable steel dies are constructed. For example, thermoplastic dies, such as a disposable core die (DCD), may be formed from an organic polymer in a rapid prototyping process. Rapid prototyping involves forming an object, based on a digital model, by layering material with a 3D printing machine. Rapid prototyping is generally effective at forming articles that have complex internal structures and thin walls, such as a DCD. Further, investment casting includes injecting a low-viscosity, silica-based ceramic slurry into the DCD, and firing the ceramic slurry to form a solidified ceramic core.

When injecting the ceramic slurry into the DCD, the slurry must be injected at a pressure sufficient to fill the complex internal structures of the DCD. However, the complex internal geometry and thin walls of the DCD may result in problems arising when forming the ceramic core. For example, the thin walls of the DCD may be susceptible to rupture above certain injection pressures, and some portions of the DCD may have regions that are not filled by the slurry. Further, the gap distance defined between the walls of the DCD must be controlled, and portions of the core may shrink at different rates during slurry solidification. As such, there is a need for an improved thin-walled disposable core die for forming ceramic articles therein.

BRIEF DESCRIPTION

In one aspect, a disposable core die is provided. The disposable core die includes a first portion defining an inlet configured to receive a slurry therethrough, a second portion integrally formed downstream from the first portion and configured to receive the slurry from the first portion, and a third portion integrally formed downstream from the second portion. The second portion includes a plurality of hollow tubes that are substantially coaxially aligned and have a wall thickness within a range defined between about 0.1 mm and about 0.5 mm, and the third portion defines an outlet configured to discharge excess slurry from the second portion.

In another aspect, a method of fabricating a ceramic body is provided. The method includes forming a disposable core die. The disposable core die includes a first portion defining an inlet configured to receive a slurry therethrough, a second portion integrally formed downstream from the first portion and configured to receive the slurry from the first portion, and a third portion integrally formed downstream from the second portion. The second portion includes a plurality of hollow tubes that are substantially coaxially aligned and have a wall thickness within a range defined between about 0.1 mm and about 0.5 mm, and the third portion defines an outlet configured to discharge excess slurry from the second portion. The method also includes injecting the slurry into the disposable core die through the inlet to integrally form the core in the shape of the disposable core die.

In yet another aspect, a method of making a disposable core die is provided. The method includes forming a first portion of the disposable core die, the first portion defining an inlet configured to receive a slurry therethrough. A second portion is integrally formed downstream from the first portion, the second portion including a plurality of hollow tubes that are substantially coaxially aligned and have a wall thickness within a range defined between about 0.1 mm and about 0.5 mm, and the plurality of hollow tubes configured to receive the slurry from the first portion. The method also includes integrally forming a third portion downstream from the second portion, the third portion defining an outlet configured to discharge excess slurry from the second portion.

DETAILED DESCRIPTION

Embodiments of the present disclosure facilitate effectively forming ceramic bodies in a disposable core die (DCD). For example, ceramic bodies such as ceramic DCD cores are generally constructed by injecting a ceramic slurry into a disposable core die, curing the ceramic slurry, removing the die from the cured core, and solidifying the core with a setter core mold in a setter firing process. In the exemplary embodiment, the DCD is formed in a rapid prototyping process. Slurry is then injected through a slurry inlet defined in a first portion of the DCD, and the slurry flows downstream from the slurry inlet to fill the remaining DCD portions. DCDs generally have thin walls constructed of polymeric material that facilitate enabling burn-off removal of the DCD from the cured ceramic core.

Embodiments of the present disclosure incorporate one or more design features that facilitate forming a complete and dimensionally accurate ceramic core. For example, the DCD described herein includes design features such as reinforcing structures that increase the rigidity of the DCD, a controlled gap distance between adjacent portions of the DCD that facilitates enabling DCD burn-off, a defined wall thickness of the DCD, a fill cavity structure coupled in flow communication with and/or a vent aperture defined within walls of the DCD to facilitate removing gas pockets from within the DCD, and/or hollow cavities defined within larger portions of the DCD to substantially match the shrink rate of the larger and smaller portions of the DCD.

Figure 1:
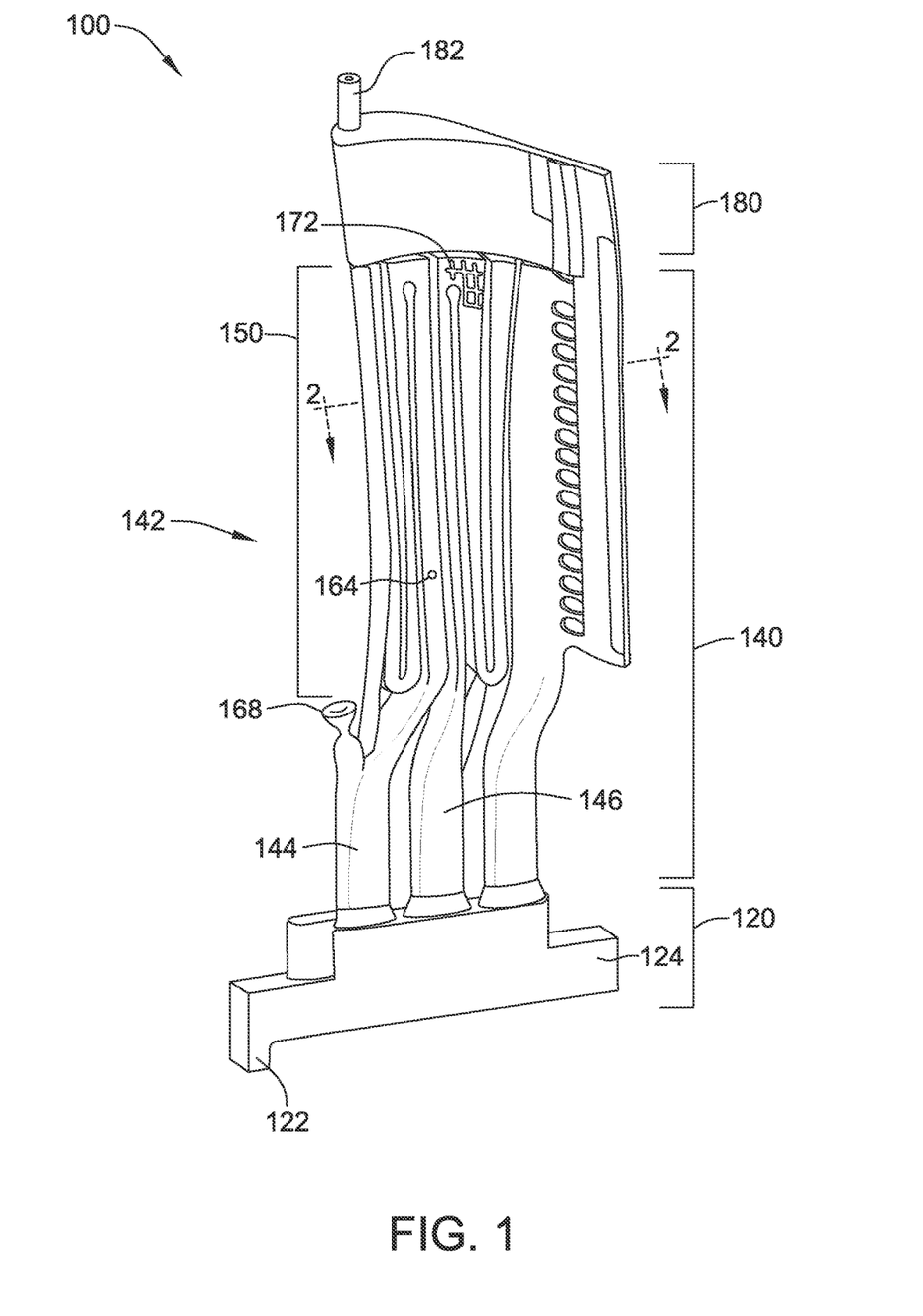
FIG. 1 is a perspective view of an exemplary disposable core die.

FIG. 1 is a perspective view of a disposable core die (DCD) 100. In the exemplary embodiment, DCD 100 includes a first portion 120, a second portion 140 integrally formed downstream from first portion 120, and a third portion 180 integrally formed downstream from second portion 140. Further, first portion 120 includes an inlet 122 for receiving slurry (not shown) therein, and third portion 180 includes an outlet 182 that discharges excess slurry therefrom. In the exemplary embodiment, outlet 182 has a smaller cross-sectional area than inlet 122. As such, outlet 182 facilitates preventing rupture of DCD 100 during slurry injection by providing pressure relief for DCD 100.

In the exemplary embodiment, first portion 120 includes a slurry reservoir 124 positioned downstream from inlet 122, and second portion 140 includes a plurality of hollow tubes 142 coupled in flow communication with reservoir 124. More specifically, hollow tubes 142 include a first feeder tube 144, a second feeder tube 146, and branching tubes 150 positioned downstream from feeder tubes 144 and 146. In the exemplary embodiment, hollow tubes 142 are substantially coaxially aligned with each other, and are configured to receive slurry therein. Further, hollow tubes 142 may have any suitable shape that enables DCD 100 to function as described herein. In the exemplary embodiment, hollow tubes 142 have substantially circular and/or oblong cross-sectional shapes.

Figure 2:
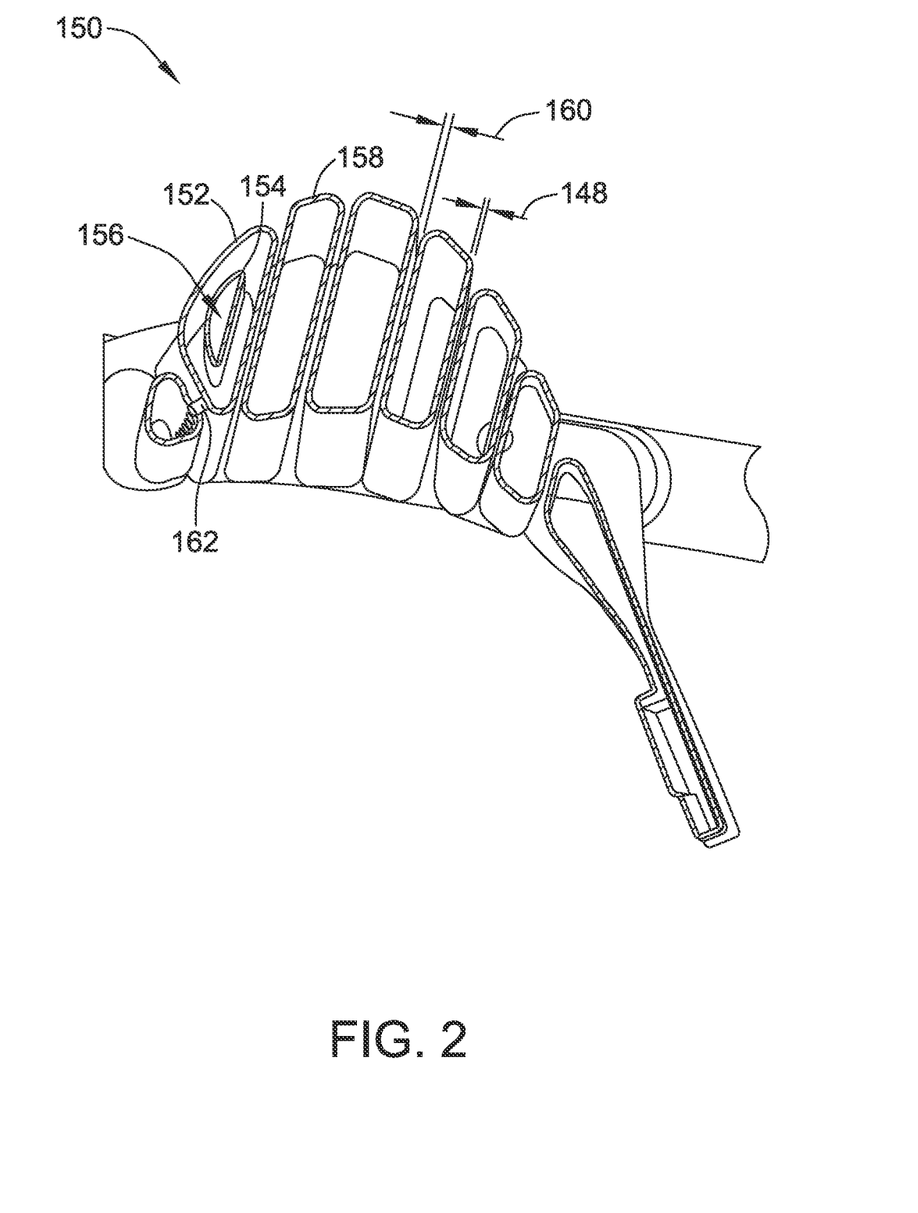
FIG. 2 is a perspective cross-sectional view of a portion of the disposable core die shown in FIG. 1 taken along line 2-2.

FIG. 2 is a cross-sectional view of a portion of DCD 100 taken along line 2-2. In the exemplary embodiment, tubes 150 are arranged to have a cross-sectional shape substantially similar to an airfoil. Further, walls of DCD 100 may have any suitable thickness that enables DCD 100 to function as described herein. In any of the various embodiments of the present disclosure, DCD 100 may have a wall thickness 148 defined within a range between about 0.1 millimeters (mm) and about 0.5 mm. In the exemplary embodiment, wall thickness 148 is thicker in areas of DCD 100 prone to distortion during slurry injection therein. For example, hollow tubes 142 are prone to distortion in sections having a larger flat surface to unit area ratio when compared to other sections of hollow tubes 142.

In the exemplary embodiment, branching tubes 150 may include a plurality of hollow cavities 156 extending therethrough. For example, tubes 150 include a first branching tube 152, and a second branching tube 154 that extends substantially coaxially through first branching tube 152, thereby defining hollow cavity 156 within tube 152. As such, ceramic slurry may only be injected into the space defined between tubes 152 and 154. In some embodiments, hollow cavities 156 may have any suitable cross-sectional area, and DCD 100 may have any suitable number of hollow cavities 156 that enables DCD 100 to function as described herein. In some embodiments, hollow cavities 156 may have any suitable volume and cross-sectional configuration that enables DCD 100 to be burned off when removing DCD 100 from the ceramic core as described above, that facilitates controlling the shrink rate of the slurry, and that facilitates improving the dimensional accuracy of the formed ceramic body. In the exemplary embodiment, tube 154 has a cross-sectional configuration that substantially conforms to the cross-sectional configuration of tube 152.

It is believed, without being bound by any particular theory, that including hollow cavities 156 within branching tubes 150 facilitates reducing the volume, reducing the cross-sectional thickness, and increasing the surface area of slurry injected into tubes 150 having hollow cavities 156 defined therein. As such, it is believed that the modification of the volume and/or surface area of the slurry facilitates substantially matching the shrink rate of the slurry within each of branching tubes 150 when the slurry is solidified. For example, the slurry volume is modified by reducing the volume of a larger branching tube, such as branching tube 152, with hollow cavities 156 to substantially match the volume of tube 152 with a smaller third branching tube 158. Further, in the exemplary embodiment, the surface area of the slurry is improved by increasing the surface area of the slurry within branching tube 152 that is exposed to hot air during core solidification.

In the exemplary embodiment, branching tubes 150 are arranged such that a gap 160 is defined between adjacent tubes 150 to facilitate preventing adjacent tubes 150 from merging during the 3D printing process. As such, gap 160 facilitates exposing a larger surface area of each branching tube 150 to hot air such that DCD 100 is more easily removed from the cured core during burn off. Gap 160 also facilitates preventing cracking of the ceramic core during DCD 100 removal. In one embodiment, gap 160 may have any suitable thickness that does not result in adjacent branching tubes 150 from merging. Further, gap 160 may have any suitable thickness that enables DCD 100 to function as described herein. In any of the various embodiments of the present disclosure, gap 160 may have a thickness of at least about 0.025 mm, at least about 0.1 mm, at least about 0.125 mm, or a range between about 0.025 mm and about 0.125 mm.

In the exemplary embodiment, DCD 100 further includes tie bars 162 extending between and coupling adjacent branching tubes 150 in flow communication with each other. Tie bars 162 facilitate reducing deformation of DCD 100 during processing, and facilitate creating a ceramic crossover between adjacent branching tubes 150. Further, tie bars 162 may have any suitable size and shape that enables DCD 100 to function as described herein. In any of the various embodiments of the present disclosure, tie bars 162 may have a substantially circular cross-sectional shape and a diameter of at least about 0.5 mm.

Figure 3:
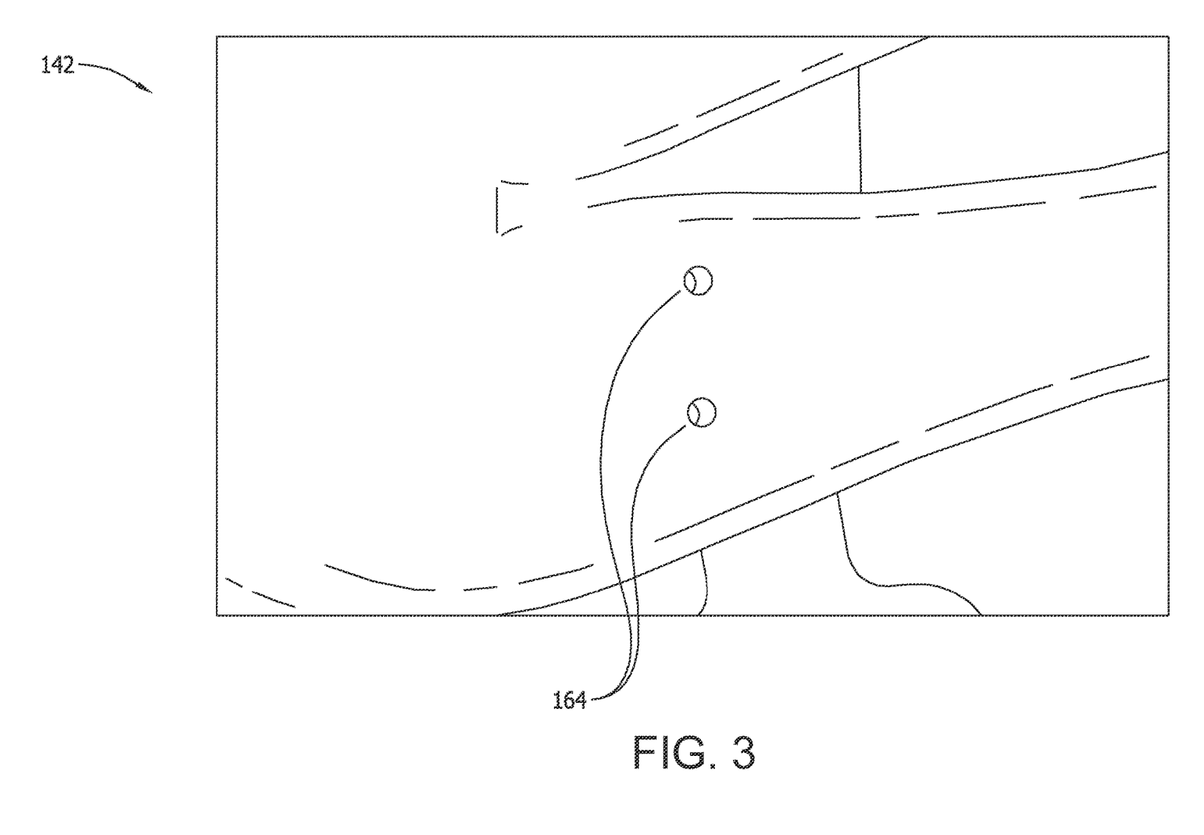
FIG. 3 is an enlarged perspective view of another portion of the disposable core die shown in FIG. 1.
Figure 4:
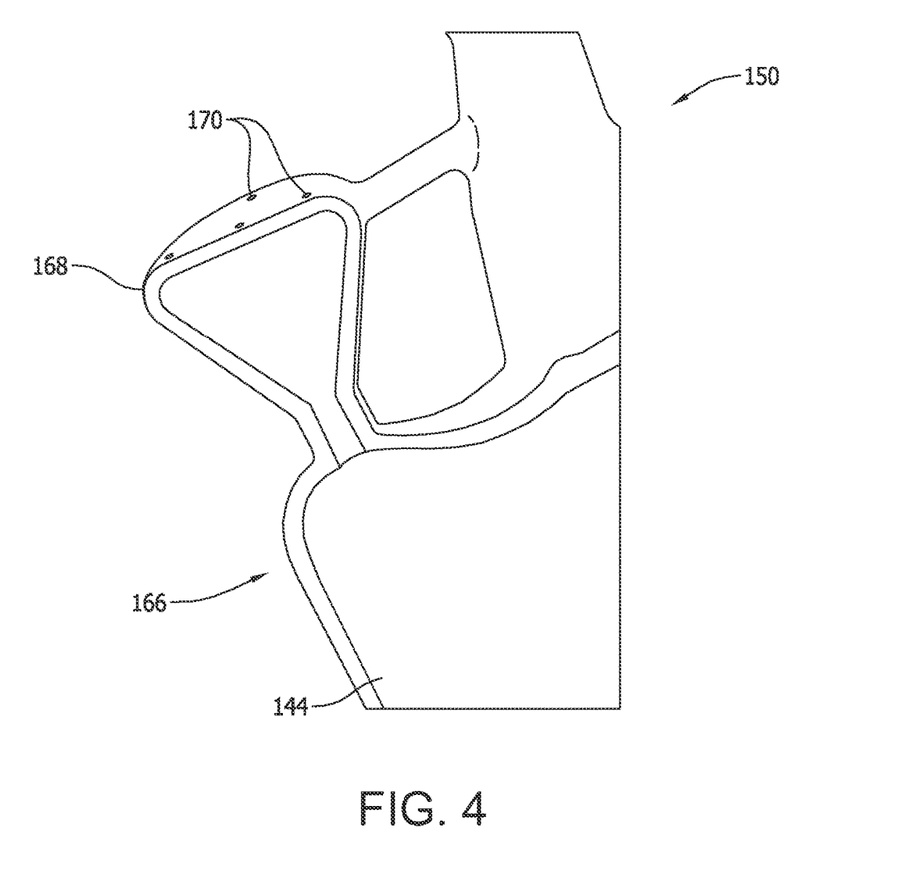
FIG. 4 is an enlarged perspective view of an exemplary fill cavity structure that may be used with the disposable core die shown in FIG. 1.

FIG. 3 is an enlarged perspective view of a portion of DCD 100, and FIG. 4 is an enlarged perspective view of a fill cavity structure 168 that may be used with DCD 100. In some embodiments, the complex geometry of DCD 100 may result in the slurry not completely filling certain portions of DCD 100 during slurry injection. As such, in the exemplary embodiment, hollow tubes 142 include a vent aperture 164 defined therein that facilitates filling internal cavities of respective hollow tubes 142. Vent aperture 164 is sized to retain solid components of the slurry within hollow tubes 142, and configured to provide a pressure release for DCD 100 such that gas pockets are removed therefrom and the slurry completely fills DCD 100. Further, liquid components of the slurry may be discharged through vent aperture 164 such that the solidified ceramic is denser in areas of DCD 100 having vent apertures 164 defined therein. In any of the various embodiments of the present disclosure, vent aperture 164 has a diameter within a range between about 0.1 mm and about 0.25 mm. In one embodiment, vent aperture 164 has a diameter of about 0.2 mm.

In some embodiments, DCD 100 includes a knob 166 protruding therefrom. More specifically, in the exemplary embodiment, feeder tube 144 includes knob 166 extending therefrom. Dead-end passages such as knob 166 may be difficult to fill with slurry. As such, in the exemplary embodiment, DCD 100 includes fill cavity structure 168 coupled in flow communication with knob 166 and one of branching tubes 150. It is believed that fill cavity structure 168 provides a pressure release for DCD 100, and a cavity for receiving excess slurry therein such that gas pockets are removed from within knob 166. Further, fill cavity structure 168 includes vent apertures 170 defined therein that function essentially as described above.

Fill cavity structure 168 facilitates filling knob 166 such that a complete ceramic core is formed when the slurry is solidified. In the exemplary embodiment, fill cavity structure 168 receives a quantity of slurry that remains therein during slurry solidification. As such, the core will include solidified ceramic in the form of fill cavity structure 168, and a complete core including solidified ceramic in the form of knob 166. More specifically, the slurry enters fill cavity structure 168 and does not seep back into knob 166 when the slurry shrinks during solidification.

Figure 5:
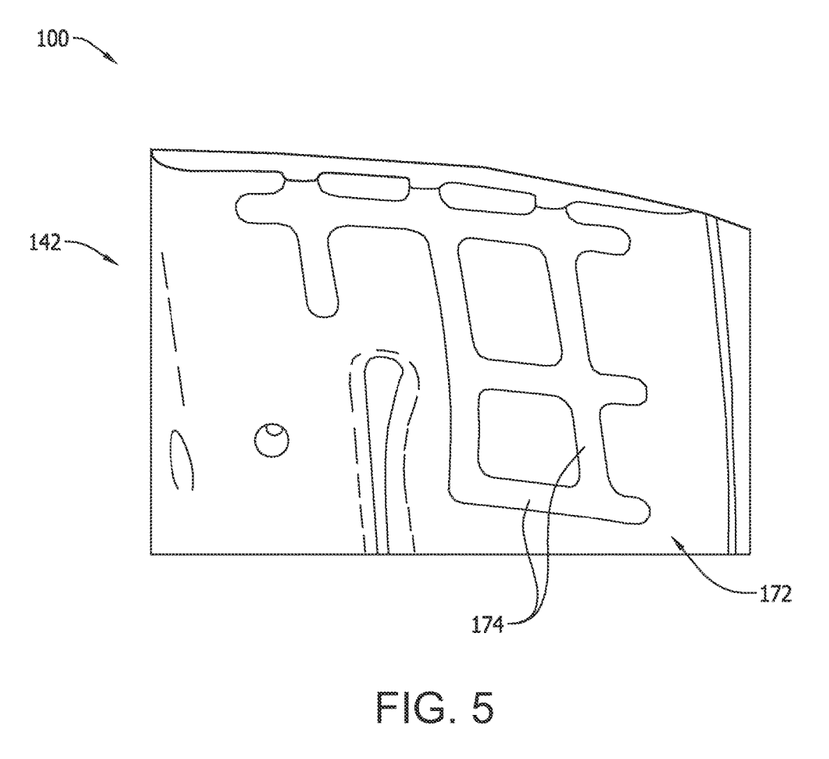
FIG. 5 is a perspective cross-sectional view of an exemplary reinforcing structure that may be used with the disposable core die shown in FIG. 1.

FIG. 5 is a perspective cross-sectional view of a reinforcing structure 172 that may be used with DCD 100. In the exemplary embodiment, DCD 100 includes reinforcing structure 172 formed on the outer surface of at least one of hollow tubes 142. Reinforcing structure 172 is located in areas of hollow tubes 142 that are prone to distortion during slurry injection therein, as described above. Further, reinforcing structure 172 has any suitable shape and thickness that enables DCD 100 to function as described herein. In the exemplary embodiment, reinforcing structure 172 includes brace structures 174 that intersect forming a grid-like configuration on the outer surface of hollow tubes 142. Further, reinforcing structure 172 has a thickness within a range defined between about 0.125 mm and about 0.625 mm.

In some embodiments, DCD 100 may be reinforced by constructing DCD walls during the 3D printing process with a software package that forms an internal cross-linked configuration within DCD walls. For example, in some embodiments, the cross-linked configuration may be formed throughout every portion of DCD 100, or only in portions prone to distortion during slurry injection. In an alternative embodiment, DCD 100 is reinforced with an external clip that conforms to the shape of one of hollow tubes 142. The external clip may be coupled to the outer surface of one of hollow tubes 142 during slurry injection, and removed therefrom prior to slurry solidification.

Figure 6:
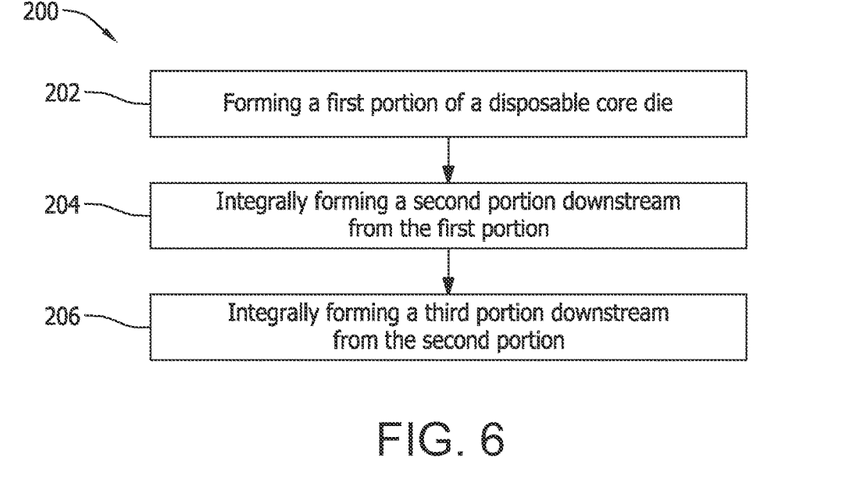
FIG. 6 is a flow diagram of an exemplary method of making a disposable core die.
Figure 7:
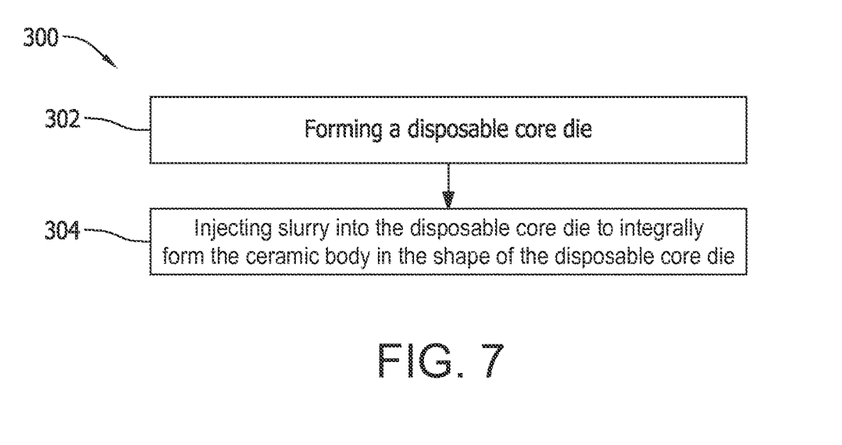
FIG. 7 is a flow diagram of an exemplary method of fabricating a ceramic body that may be used with the disposable core die shown in FIG. 1.

FIG. 6 is a flow diagram of a method 200 of making DCD 100, and FIG. 7 is a flow diagram of a method 300 of fabricating a ceramic core (not shown) that may be used with DCD 100. In the exemplary embodiment, DCD 100 is made by forming 202 first portion 120 of DCD 100, integrally forming 204 second portion 140 downstream from first portion 120, and integrally forming 206 third portion 180 downstream from second portion 140. Further, in the exemplary embodiment, the ceramic core is fabricated by forming 302 DCD 100, and injecting 304 slurry into DCD 100 to integrally form a core in the shape of DCD 100.

The disposable core die described herein incorporates one or more design features that facilitate creating ceramic cores having improved dimensional accuracy. More specifically, the DCD includes one or more of a defined wall thickness, controlled gap distance, a fill cavity structure, a vent aperture, reinforcing structures, hollow cavities, and/or tie bars. By including the design features described herein, embodiments of the present disclosure overcome problems associated with injection molding to form ceramic articles. As such, the DCD described herein facilitates forming a complete and dimensionally accurate ceramic core.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of fabricating a ceramic body, said method comprising: forming a disposable core die including: a first portion defining an inlet configured to receive a slurry therethrough; a second portion integrally formed downstream from the first portion, the second portion comprising a plurality of hollow tubes that are substantially coaxially aligned and have a wall thickness within a range defined between about 0.1 mm and about 0.5 mm, said plurality of hollow tubes configured to receive the slurry from the first portion; and a third portion integrally formed downstream from the second portion, the third portion defining an outlet configured to discharge excess slurry from the second portion; injecting the slurry into the disposable core die through the inlet to integrally form the ceramic body in the shape of the disposable core die; and removing gas pockets formed in the disposable core die during said injecting, said removing comprising at least one of: coupling a fill cavity structure in flow communication with at least one of the plurality of hollow tubes; and defining at least one vent aperture within at least one of the plurality of hollow tubes, wherein the at least one vent aperture is configured to retain solid components of the shut' within the at least one of the plurality of hollow tubes.

2. The method in accordance with claim 1, wherein coupling a fill cavity structure comprises receiving excess material in the fill cavity such that the slurry substantially fills the disposable core die.

3. The method in accordance with claim 1, wherein said disposable core die is constructed from an organic polymer.

4. The method in accordance with claim 1, wherein a gap of at least about 0.025 millimeters (nun) is defined between each of said plurality of hollow tubes.

5. The method in accordance with claim 1, wherein a first of said plurality of hollow tubes extends substantially coaxially through a second of said plurality of hollow tubes to define a hollow cavity within said second hollow tube.

6. The method in accordance with claim 1, further comprising a fill cavity structure coupled in flow communication with at least one of said plurality of hollow tubes.

7. The method in accordance with claim 6, wherein said at least one of said plurality of hollow tubes comprises a knob protruding therefrom, wherein said fill cavity is coupled in flow communication with said knob to remove a gas pocket from within said knob.

8. A method of fabricating a ceramic body, said method comprising: forming a disposable core die including: a first portion defining an inlet configured to receive a slurry therethrough; a second portion integrally formed downstream from the first portion, the second portion comprising a plurality of hollow tubes that are substantially coaxially aligned and have a wall thickness within a range defined between about 0.1 mm and about 0.5 mm, said plurality of hollow tubes configured to receive the slurry from the first portion; and a third portion integrally formed downstream from the second portion, the third portion defining an outlet configured to discharge excess slurry from the second portion; and injecting the slurry into the disposable core die through the inlet to integrally form the ceramic body in the shape of the disposable core die; wherein at least one of said plurality of hollow tubes comprises at least one vent aperture defined therein that is configured to retain solid components of the slurry within said at least one of said plurality of hollow tubes.

9. A method of fabricating a ceramic body, said method comprising: forming a disposable core die including: a first portion defining an inlet configured to receive a slurry therethrough; a second portion integrally formed downstream from the first portion, the second portion comprising a plurality of hollow tubes that are substantially coaxially aligned and have a wall thickness within a range defined between about 0.1 mm and about 0.5 mm, said plurality of hollow tubes configured to receive the slurry from the first portion; and a third portion integrally formed downstream from the second portion, the third portion defining an outlet configured to discharge excess slurry from the second portion; and injecting the slurry into the disposable core die through the inlet to integrally form the ceramic body in the shape of the disposable core die; wherein the die further comprises a reinforcing structure formed on an outer surface of at least one of said plurality of hollow tubes.

10. The method in accordance with claim 9, wherein said reinforcing structure has a thickness within a range defied between about 0.125 mm and about 0.625 mm.

\* \* \* \* \*